United States Patent [19]

Freeman

[11] 4,195,672
[45] Apr. 1, 1980

[54] PORTABLE LIQUID PESTICIDE TRANSFER ASSEMBLY

[76] Inventor: James F. Freeman, 4344 Greenbrier Rd., Long Beach, Calif. 90808

[21] Appl. No.: 909,037

[22] Filed: May 24, 1978

[51] Int. Cl.$^2$ .............................................. B65B 31/00
[52] U.S. Cl. ...................................... 141/91; 141/231
[58] Field of Search ........................................ 141/1-12, 141/59, 83, 84, 93, 94, 129, 231, 232, 233, 234, 237, 240, 281, 283, 285, 382, 242, 18, 89-92; 214/41 R, 44 R; 137/205, 627.5

[56] References Cited

U.S. PATENT DOCUMENTS

| | | | |
|---|---|---|---|
| 3,971,400 | 7/1976 | Thompson | 141/59 |
| 4,059,134 | 11/1977 | Violette | 141/59 |

*Primary Examiner*—Houston S. Bell, Jr.
*Attorney, Agent, or Firm*—William C. Babcock

[57] ABSTRACT

A portable liquid pesticide transfer assembly capable of being removably mounted on a side wall that extends upwardly from a bed portion of a conventional pickup truck. The assembly when so mounted permits liquid pesticide to be transferred through a closed system from the container in which it is marketed to a tank for dispensing purposes without danger of the pesticide contacting the user or the user being subjected to the fumes thereof. The container after the pesticide is removed therefrom is capable of being washed together with the assembly, without the user being subjected to inadvertent contact with the pesticide containing wash water. The assembly includes a closure for removably sealing the container when the container has a quantity of pesticide remaining therein.

10 Claims, 16 Drawing Figures

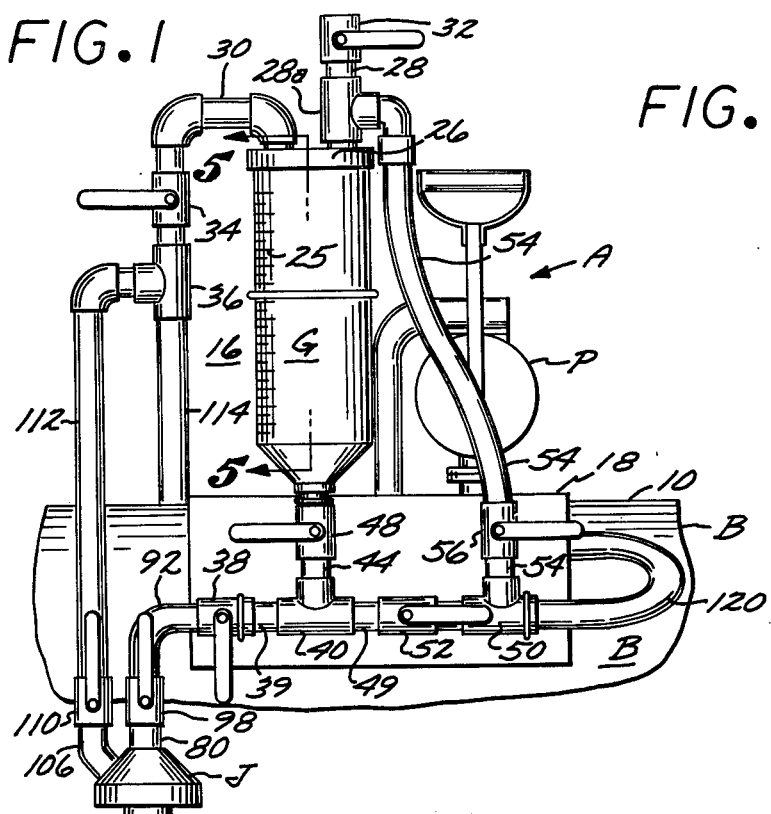
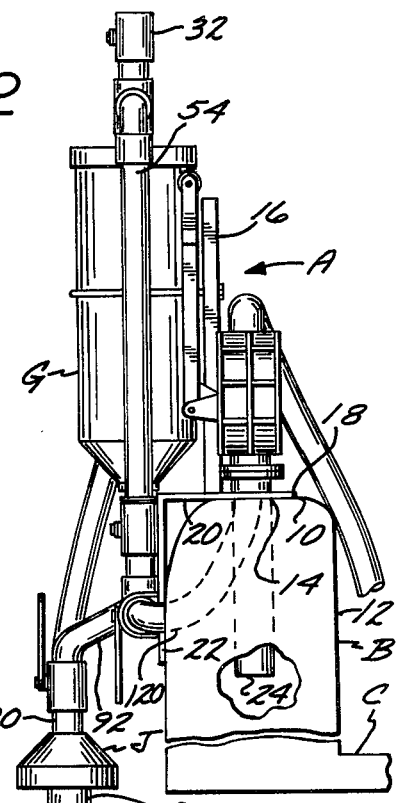
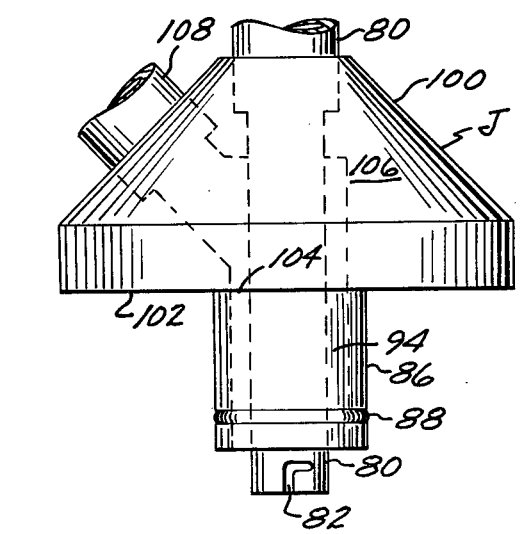
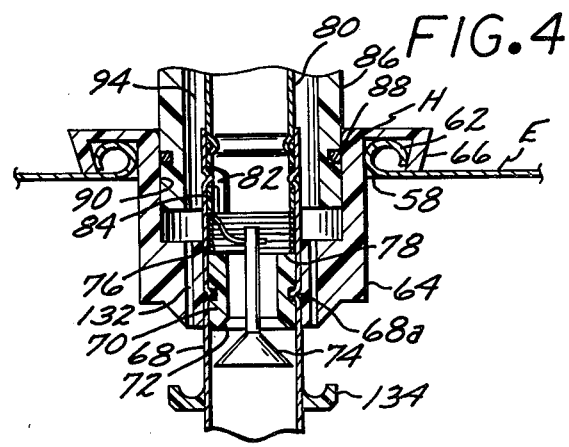

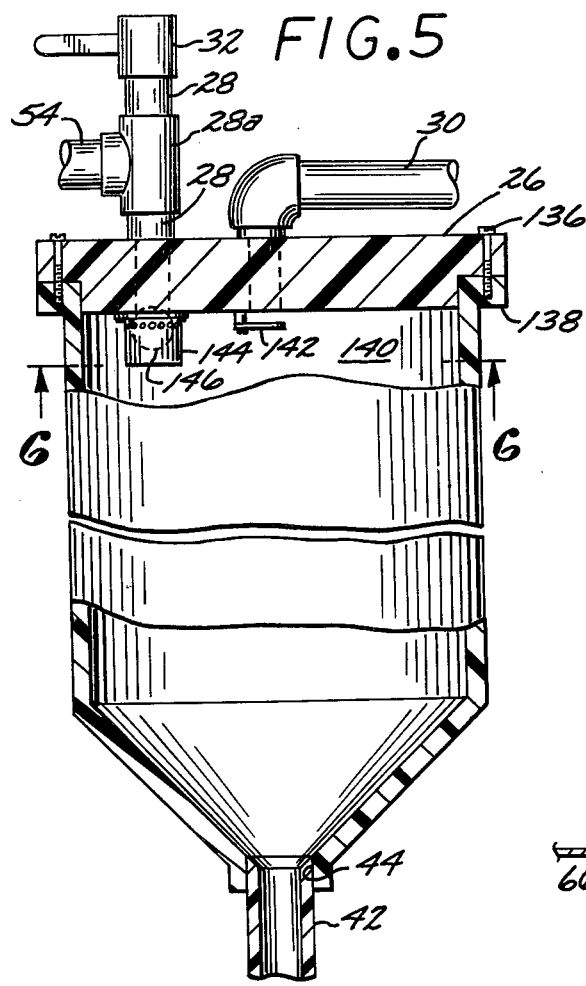
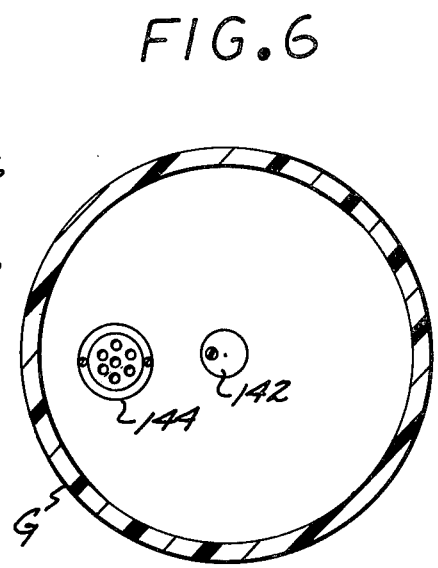
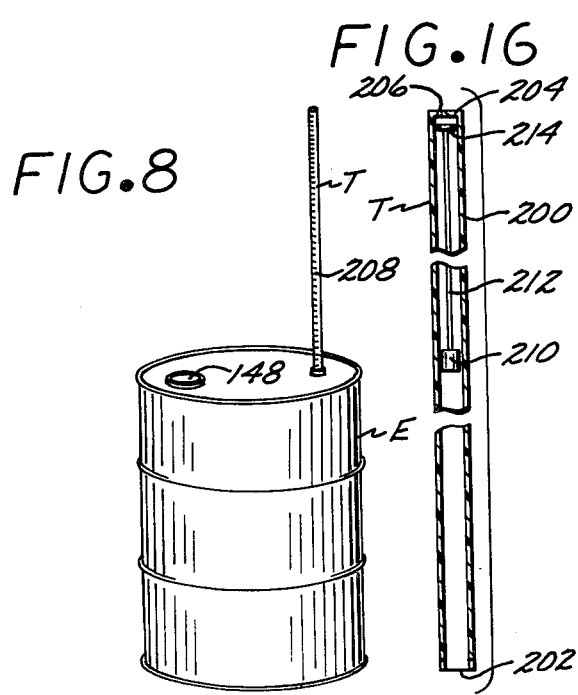
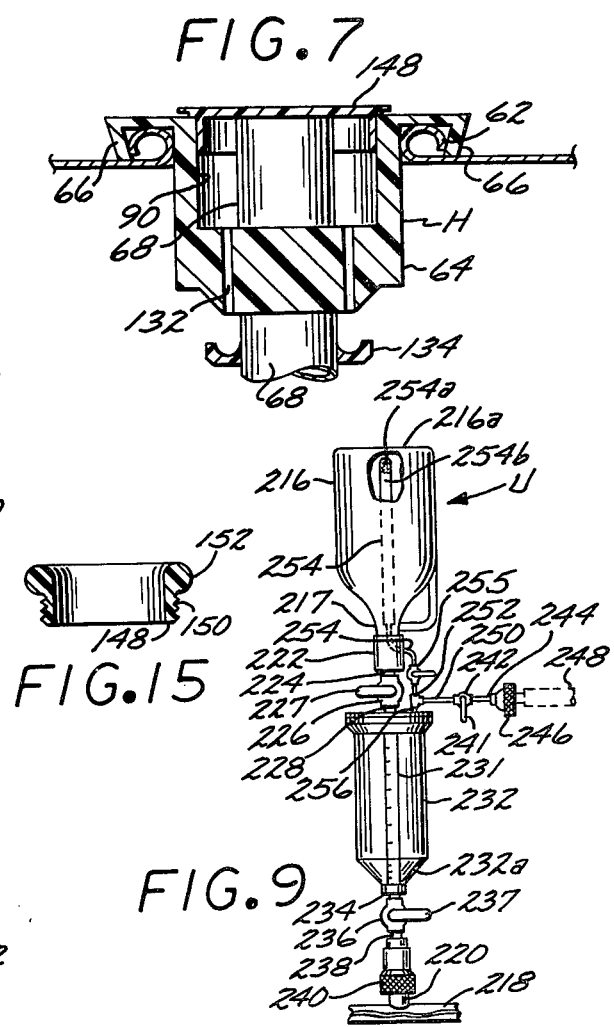

PORTABLE LIQUID PESTICIDE TRANSFER ASSEMBLY

BACKGROUND OF THE INVENTION

1. Field of the Invention

Portable liquid pesticide transfer assembly.

2. Description of the Prior Art

During recent years the use of highly toxic liquid pesticides has increased markedly in the control of insects detrimental to crops. The use of such pesticides entails the transfer from the original containers in which they are marketed to tanks from which they are dispensed either in a concentrated or diluted form. This transfer of pesticides from the original container to the dispensing tank is extremely hazardous, as agricultural workers may inadvertently have the pesticides spilled on clothing, or be subjected to highly toxic fumes of this material. The hazards of using such pesticides is becoming increasingly evident, and it has now been established that a number of human illnesses may be attributed to inadvertent exposure to these pesticides or to fumes thereof. To minimize this hazard it is common practice for agriculture workers handling this material to wear protective clothing and equipment, but even these precautions have proven to be insufficient when the pesticide is poured from the container in which it is marketed to the tank from which it will be dispensed. To minimize such inadvertent exposure to highly toxic pesticides many States have now required that the pouring of the pesticide from the original container in which it is marketed to a dispensing tank be banned, and the transfer of the pesticide be accomplished by a closed system.

A major object of the present invention is to provide a portable liquid pesticide transfer assembly that may be removably mounted on a pick-up truck or other desired vehicle, and one that permits toxic liquid pesticide to be transferred in metered amounts from a container in which the pesticide is marketed to a dispensing tank through a closed system that minimizes any possibility of the pesticide coming into physical contact with the clothing or flesh of an agricultural worker or the worker breathing the fumes during the transfer operation.

Another object of the invention is to provide a portable liquid pesticide transfer assembly that not only makes the transfer from the original container in which the pesticide is marketed to the dispensing tank through a closed system, but permits the container and the present invention to be thoroughly washed after the transfer is made, and the washing operation being through a closed system that substantially eliminates the possibility of the pesticide containing wash water coming into contact with the agricultural worker conducting the handling of the pesticide.

Another object of the invention is to supply a portable liquid pesticide transfer assembly that is light in weight, compact, simple and easy to use, may be easily disassembled for cleaning purposes, is strong, durable, and has a measuring cylinder that is substantially impervious to a normal impact to which it will be subjected, and the measuring tank of the invention being easy to calibrate.

Yet another object of the present invention is to furnish a portable liquid pesticide transfer assembly that when mounted on a truck permits it to be easily transported from one location to another, but the assembly due to being removably secured to the side wall portion of the vehicle adjacent the bed being convenient for use, but not occupying valuable truck bed space.

SUMMARY OF THE INVENTION

A portable liquid pesticide transfer assembly that includes a spring loaded valve closure that engages the opening of the container in which the pesticide is marketed, and the closure capable of being removably and sealingly engaged by a probe secured to a flexible hose or conduit that forms a part of the assembly. The major portion of the assembly is secured in predetermined relationship on a vertically disposed frame that is removably secured to a side wall that extends upwardly from the bed of a flat bed truck.

The frame supported portion of the assembly includes a vertically disposed calibrated cylinder, a pump, and a number of separately actuatable valves that so control the flow of liquid through a number of conduits that a direct transfer of pesticide from the container in which it is marketed to a dispensing tank may be made, a metered transfer of pesticide from the container to the tank may be conducted, the container and probe supported hose may be washed in a closed circuit, or the container alone may be washed without danger of the pesticide containing wash water contacting the clothing or flesh of an agricultural worker conducting the operation.

BRIEF DESCRIPTION OF THE DRAWINGS

FIG. 1 is a side elevational view of the portable liquid pesticide transfer assembly removably supported on a side wall of a vehicle adjacent a bed thereof;

FIG. 2 is an end elevational view of the assembly shown in FIG. 1;

FIG. 3 is a fragmentary front elevational view of a portion of the assembly that supports a probe;

FIG. 4 is a fragmentary vertical cross sectional view of a closure that includes a spring-loaded valve, which closure is mounted in the opening of the container or drum in which the pesticide is marketed, and the closure removably engaged by a probe that forms a part of the assembly;

FIG. 5 is a combined side elevational and vertical cross sectional view of the calibrated cylinder used in metering a desired quantity of the pesticide and forming a part of the assembly;

FIG. 6 is a transverse cross-sectional view of the cylinder taken on the line 6—6 of FIG. 5;

FIG. 7 is a vertical cross-sectional view of the closure mounted in the container or drum in which the pesticide is marketed, with the closure being sealed by a cap that removably engages the same;

FIG. 8 is a perspective view of a drum or container in which the pesticide is mounted, with the vent opening therein being engaged by a calibrated tubular member which by means of a float and associated rod indicates the contents of the drum or container;

FIG. 9 is a perspective view of the portable liquid pesticide transfer assembly that is used in transferring pesticides from small bottles or containers to a dispensing tank;

FIG. 15 is a longitudinal cross-sectional view of the adapter used when liquid pesticide is being removed from a drum having a tapped bung hold in the top of the drum; and FIG. 16 is a longitudinal cross-sectional view of the liquid measuring gauge shown partially disposed in a drum in FIG. 8.

DESCRIPTION OF THE PREFERRED EMBODIMENT

Figure 10:
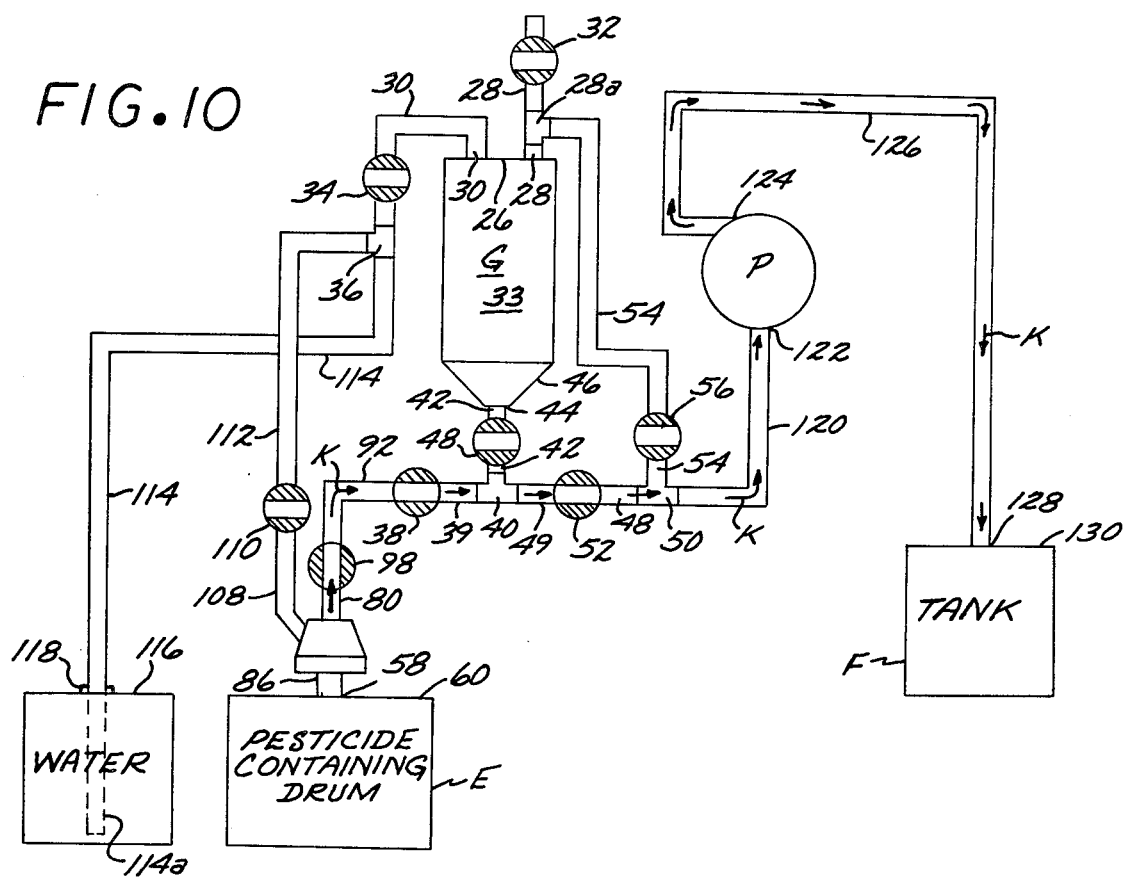
FIG. 10 is a diagrammatic view of the assembly indicating the position in which the numerous valves that form a part thereof are disposed when there is a direct transfer of the pesticide from the container or drum in which it is marketed to a dispensing tank.

The portable liquid pesticide transfer assembly A as may best be seen in FIGS. 1 and 2 is adapted to be removably mounted on a side wall B that extends upwardly from an edge portion of a flat bed C of an automotive vehicle (not shown). Side wall B includes a flat longitudinal top 10 and a substantially vertical external side wall 12. Top 10 is formed with a number of spaced downwardly extending openings 14 therein.

Assembly A includes an upwardly extending plate or frame 16 that is secured to a support 18 of transverse L-shape. Support 18 has a horizontal leg 20 and a vertical leg 22. The horizontal leg 14 has a prong 24 depending therefrom that may be extended downwardly through opening 14, with leg 20 then removably resting on top 20, and leg 22 abutting against external surface 12.

The assembly A when so mounted may be used to transfer toxic liquid pesticide from a drum or container E in which it is marketed to a tank F from which it may be dispensed by conventional means. The plate 16 supports a vertically extending transparent cylinder G that has calibrations 25 thereon. The cylinder G is adapted to have liquid pesticide discharged thereinto, and metered amounts of the pesticide capable of being withdrawn from the cylinder.

Cylinder G has a closed upper end 26 that has first and second openings therein that communicate with first and second conduits 28 and 30. First conduit 28 has a first valve 32 connected thereto, and the first valve when in the open position establishing communication between the interior confined space 34 in cylinder G and the ambient atmosphere. First conduit 28 includes a tee 28a.

The second conduit 30 has a second valve 34 therein, with the second conduit connected to a tee 36.

A third valve 38 is provided that is connected to a third conduit 39 that extends to a tee 40, which tee has a fourth conduit 42 extending therefrom that communicates with an opening 44 in the downwardly tapering bottom 46 of cylinder G. Fourth conduit 42 has a fourth valve 48 therein. Tee 40 has a fifth conduit 49 extending therefrom to a tee 50. Fifth conduit 49 has a fifth valve 52 therein as may be seen in FIG. 10.

Tee 50 is connected by a sixth conduit 54 to tee 28a. Sixth conduit has a sixth valve 56 therein. The drum or container E has an opening 58 in the top 60 thereof, which opening has a turned-over bead 62 extending upwardly therefrom as shown in FIG. 4. After the sealed cap (not shown) is removed from the opening 58, a closure H shown in detail in FIG. 4 is inserted therein. The closure H includes a cup-shaped body 64 that has a ring-shaped flange 66 of generally L-shaped transverse cross-section extending outwardly therefrom that removably engages bead 62. Body 64 supports a downwardly extending tube 68 in which a tubular body 70 is disposed that defines a tapered valve seat 72. Tubular body 70 is supported in tube 68 by conventional means 68a. A taper valve member 74 is longitudinally movable in tube 68 and tends at all times to be moved into sealing contact with valve seat 72 by a compressed helical spring 76 that rests on the upper surface 78 of body 76.

A tubular probe 80 is provided that has a pair of inverted J-shaped slots 82 therein that may removably engage a pair of lugs 84 on the upper interior portion of tube 68. The probe 80 is disposed within a tube 86 that forms a part of a fitting J, which tube supports a sealing ring 88 that engages the interior cylindrical surface 90 of cup-shaped body 64.

A seventh conduit 92 extends from third valve 38 to a seventh valve 98 a may be seen in FIG. 10. The seventh valve 98 is connected to the probe 80 as shown in FIG. 3. The fitting J is illustrated in FIG. 3 as including a conical shell 100 that has the upper end sealed to probe 80. Shell 100 has a bottom 102 that has tube 86 sealed thereto and depending therefrom. Shell 100 and bottom 102 serve to define a confined space 106. The probe 80 and tube 86 define an annulus shaped space 94 therebetween that is in communication with the confined space 106. Bottom 100 has an opening 104 therein that affords communication between annulus shaped space 94 and the confined space 106.

An eighth conduit 108 is in communication with confined space 106 and extends to an eighth valve 110, which valve has a ninth conduit 112 extending therefrom to tee 36. A tenth conduit 114 is connected to tee 36 and extends to a portable water containing tank 116 that is illustrated as a drum in FIG. 10. The tenth conduit 114 has conventional fastening means 118 thereon, which fastening means permit the tenth conduit to be removably secured to an opening in the top of the tank 116. A tubular extension 114a is secured to tenth conduit 114 and extends downwardly into the tank 116 adjacent the bottom thereof. The tenth conduit 114 is removably held in connection with the water containing tank 115 by conventional fastening means 116 that permit the extension 114a to project into the tank.

An eleventh conduit 120 extends from the tee 50 to the suction opening 122 in a pump P, which pump has a discharge opening 124 connected to a twelfth conduit 126. The conduit 126 extends to an opening 128 in the top 130 of the tank F.

The body 64 as may be seen in FIG. 4 has a number of circumferentially spaced, longitudinally extending ports 132 formed therein that are in communication with the interior of the drum E. A deflector plate 134 is secured to the tube 68 and disposed below the ports 132 as shown in FIG. 4. The purpose of the ports 132 as will later be explained is to permit wash water to discharge downwardly therethrough, and be deflected outwardly by the plate 134 to thoroughly wash the interior of the drum E after the liquid pesticide has been substantially discharged therefrom.

The top 26 as can be seen in FIG. 5 is in the form of a blind flange that is removably secured by bolts 136 or other conventional fastening means to a complementary flange 138 that forms a part of the measuring cylinder G. The cylinder G within the interior 140 thereof has a flash plate 142 supported by conventional means from the top 26 and in alignment with the second conduit 30 that extends through the top 26. The perforated basket 144 is supported from the top 26 within the interior 140, and is in communication with the first conduit 28, and the basket serving to support a buoyant ball 146. If the interior 140 is allowed to have liquid pesticide flow thereinto above the top of the graduations 25, the ball 146 will float upwardly to obstruct entry into the first conduit 28.

The use and operation of the assembly A is as follows. When it is desired to transfer pesticide from the drum E to the tank F, the cap (not shown) is removed from the drum, and the closure H is caused to engage the bead 62 as shown in FIG. 4, with the tube 68 projecting downwardly into the interior of the drum. The seventh valve 98, third valve 38, and the fifth valve 52 are all placed in the open position, and the pump P is actuated. The pump P may be either hand operated or driven by a motor or engine (not shown). The twelfth conduit 126 extends downwardly through the opening 128 in the top 130 of the tank F. After the sealed cap (not shown) is removed from the drum E, the closure member H is inserted downwardly into the fluid discharge opening, with the closure member engaging the bead 62 as shown in FIG. 4. The tube 68 is of such length as to extend downwardly to a position adjacent the bottom of the drum. The fixture J shown in FIG. 3 is now caused to engage the closure member H and the fixture occupying the position shown in FIG. 4, as well as FIG. 10. The fixture J is removably secured to the closure member H by causing the slots 82 to engage the lugs 84. When such engagement of the slots 82 takes place with the lugs 84, the spring 76 is compressed, and moves the tapered valve member 74 downwardly to permit liquid pesticide in the drum E to be drawn upwardly through the tube 68 and probe 80 due to the suction generated by the pump P. In FIG. 10 it will be seen that the first valve 32, second valve 34, fourth valve 48, sixth valve 56, and eighth valve 110 are in the closed position. The flow of liquid pesticide from the drum E when the pump P is actuated will be through the open valve previously identified and the conduit 92, 39, tee 40, conduit 49, conduit 48, tee 50, conduit 120, pump P, conduit 126, to the tank F. The flow of fluid through the conduits and valves previously identified is indicated by a series of arrows K on FIG. 10.

Figure 11:
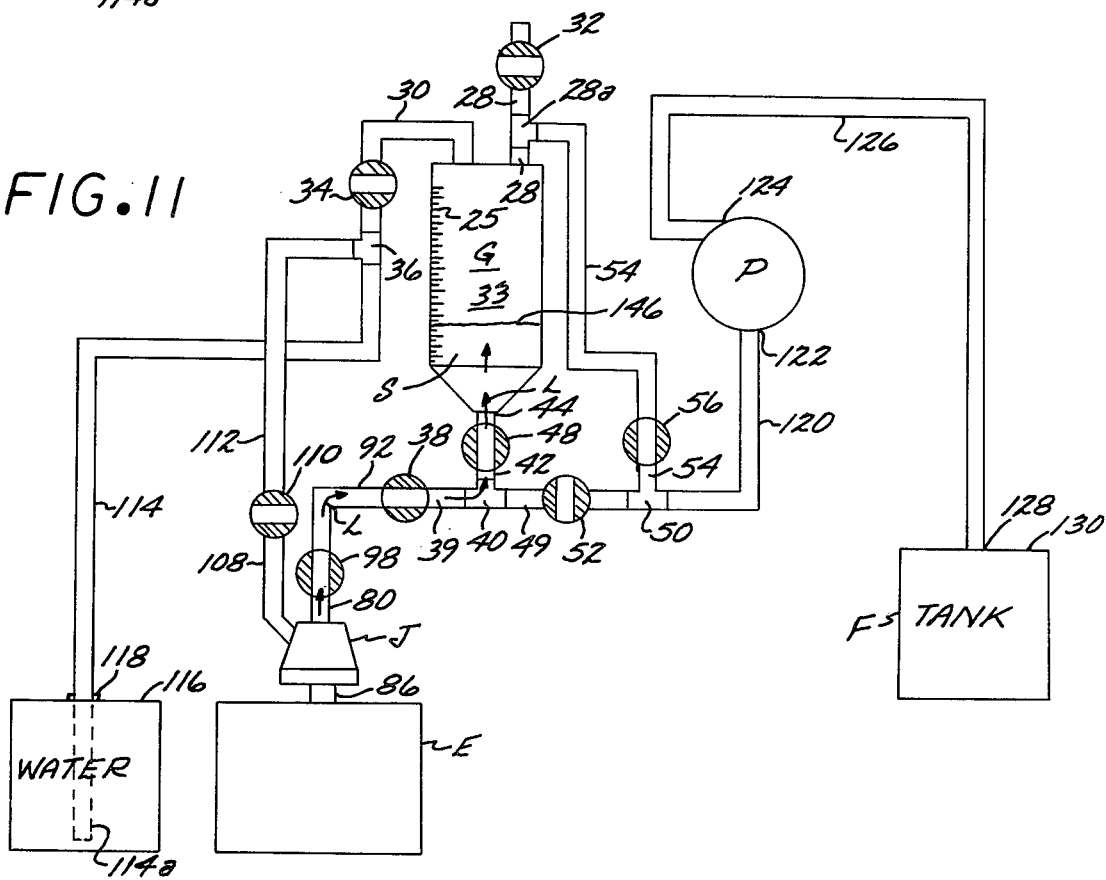
FIG. 11 is the same view as shown in FIG. 10 but with the valves positioned to draw a desired quantity of the pesticide into the calibrated tank.

When it is desired to transfer a desired quantity of the liquid pesticide to the drum E to the calibrated cylinder G, the connections previously described relative to the FIG. 10 are made, but with the valves being opened and closed in a different manner. In FIG. 11 it will be seen that the seventh valve 98, third valve 38, fourth valve 48, and sixth valve 56 are placed in the open position, and first valve 32, second valve 34, fifth valve 52, and eighth valve 110 being in the closed position. The operation of the pump P causes a negative pressure to be created in the interior 33 of the graduated cylinder G, and liquid pesticide as a result flowing upwardly through the probe 80, conduit 92, conduit 39, tee 40, conduit 42, and conduit 44 into the interior of the cylinder. This flow continues until the liquid pesticide S has risen to a desired level 146 and the contents of the cylinder G being indicated by the relative position of the liquid level 146 to the graduations 25. The direction of flow of the pesticide S from the drum E to the cylinder G is indicated by the series of arrows L in FIG. 11.

Figure 12:
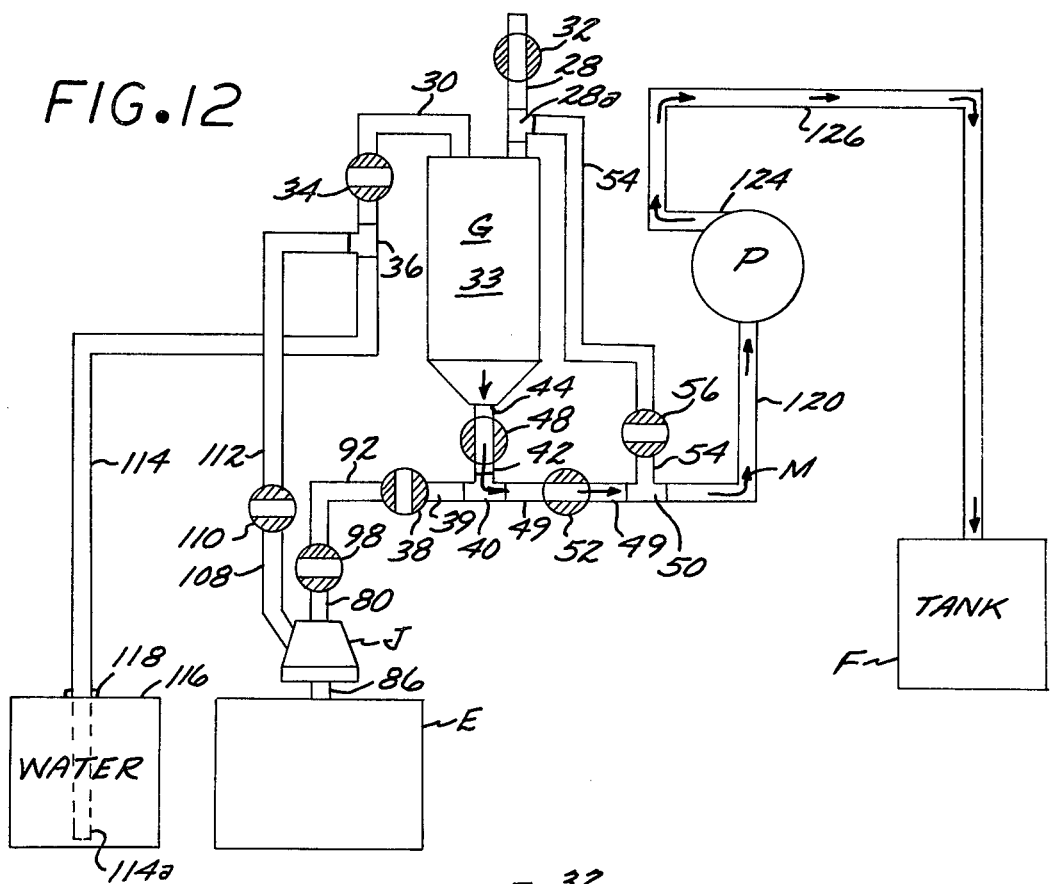
FIG. 12 is the same view as shown in FIG. 11 but with the valves disposed to transfer a metered quantity of the pesticide from the calibrated cylinder to the dispensing tank.
Figure 13:
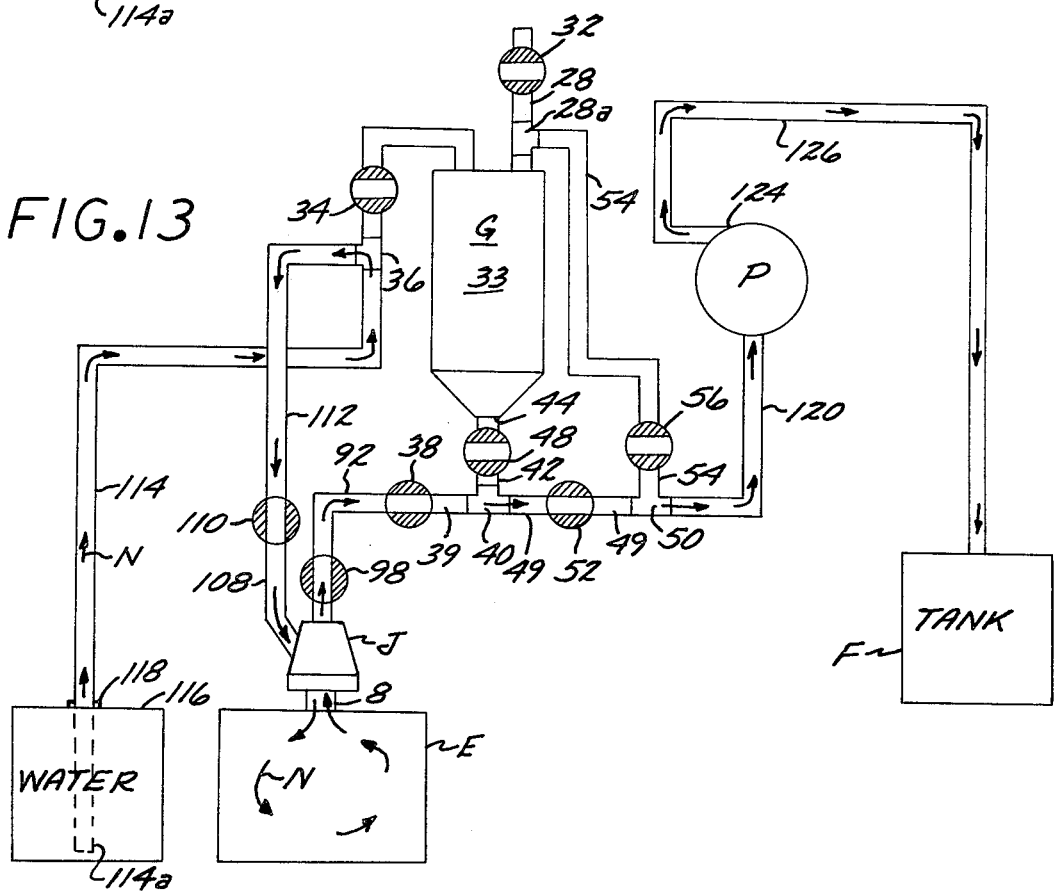
FIG. 13 is the same view as shown in FIG. 12 but with the valves disposed to rinse the container or drum in which the pesticide is marketed as well as the hose leading therefrom.

After a desired quantity of the pesticide S has been drawn into the calibrated cylinder G, the pesticide may be transferred therefrom to the tank F by disposing the valve in the positions as shown in FIG. 12. The first valve 32, fourth valve 48, fifth valve 52 are placed in the open position, and the balance of valves previously identified in connection with the assembly A are placed in the closed position. The pump P is operated, the suction generated thereby, causes a liquid pesticide F in cylinder G to flow through conduit 44, conduit 42, tee 40, conduit 49, tee 50, conduit 120 into the pump P, and discharge from the pump through conduit 126 into the tank F. The flow of liquid pesticide through the path previously described is indicated visually by the arrows M on FIG. 12. In FIG. 13 the valves are disposed to permit the rinsing of the interior of the drum E with wash water, as well as the conduit leading therefrom, and the wash water being supplied from the container 116. The wash water containing liquid pesticide S mixed therewith is discharged to the tank F for subsequent disposal.

The valves of the assembly A as shown in FIG. 13 are disposed to effect a rinsing of the container E and certain of the conduits operatively associated therewith with water from the container 116, after the liquid pesticide S has been discharged from the drum E. In FIG. 13 it will be seen that the first valve 32, second valve 34, fourth valve 44, and sixth valve 56 are in the closed position, while the third valve 38, fifth valve 52, seventh valve 98, and eighth valve 110 are in the open position. The suction created by the operation of the pump P causes water to flow upwardly from the extension 114a, conduit 114, tee 36, conduit 112, and conduit 108 into the annulus-shaped space 94 shown in FIG. 4 to flow through the port 132 to the deflection plate 134 where the water is forced outwardly to contact the interior surface of the drum E, and circulating in the interior of the drum E until it enters the tube 68 to flow upwardly through the probe 80 to conduit 92, conduit 39, tee 40, conduit 49, tee 50, conduit 120, and conduit 126 into the tank F. The flow of water from the container 116 to rinse out the drum E and then flow to the tank F is indicated by the arrows N shown in FIG. 13.

Figure 14:
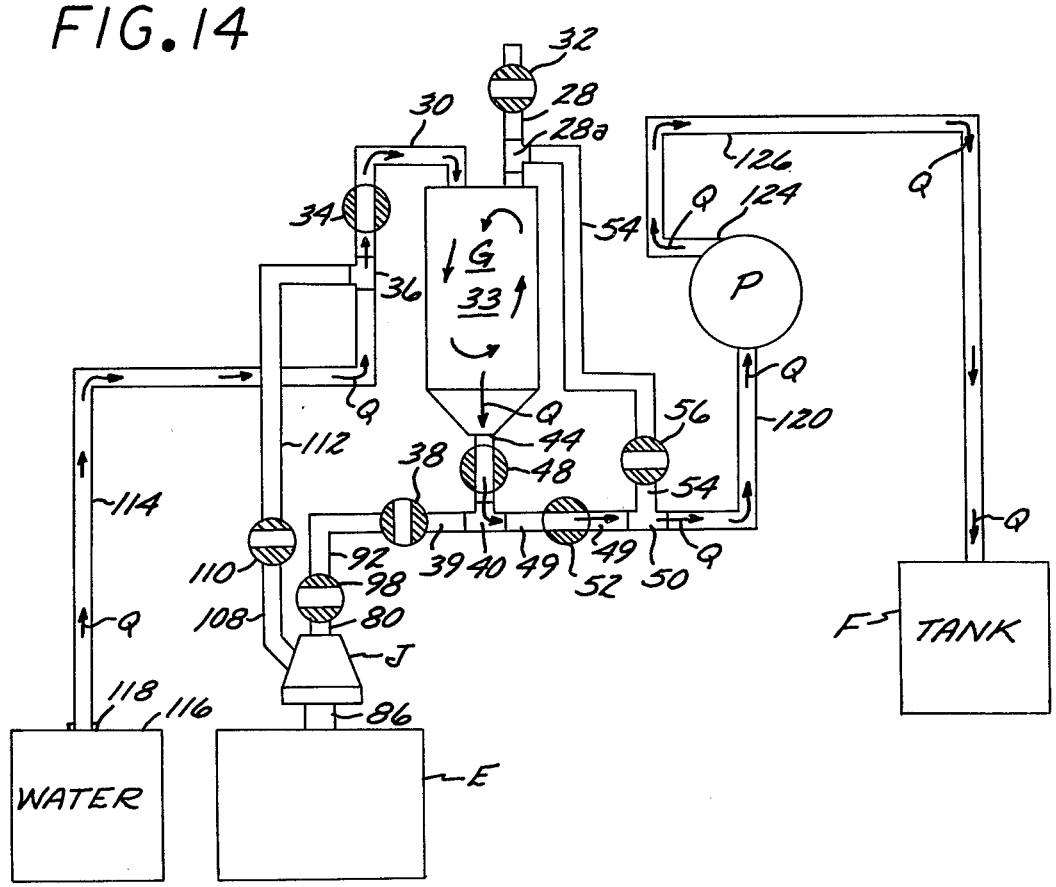
FIG. 14 is the same view as shown in FIG. 13, but with the valves disposed to rinse the calibrated cylinder with wash water that is discharged to the dispensing tank.

In FIG. 14 the valves are arranged to rinse the calibrated cylinder with wash water, which wash water is subsequently discharged to the tank F.

In FIG. 14 the valves are disposed to rinse the interior 33 of the cylinder G with wash water from the container 116 with the wash water contaminated with remnants of the pesticide from the cylinder G being discharged to the tank F for subsequent disposal.

In FIG. 14 it will be seen that the first valve 32, third valve 38, sixth valve 56, seventh valve 98, and eighth valve 110 are closed, with the second valve 34, fourth valve 48, and fifth valve 52, being in the open position. Upon the pump P being actuated, the suction created thereby causes water to flow through the conduit 114, tee 36, conduit 30 into the interior of the calibrated cylinder G where the water flushes pesticide S from the interior surfaces thereof with the water and traces of pesticide then flowing through conduit 44, tee 40, conduit 49, tee 50, conduit 120, to the pump, to be discharged from the pump through the conduit 126 to the tank F for subsequent disposal purposes. The path of the rinse water when the above-described operation is taken place is indicated by a series of arrows Q on the conduit and through the cylinder G. When it is desired to seal the drum E after a part of the insecticide has been removed therefrom, the tube 86 and probe 80 shown in FIG. 4 are removed from the closure H, and a cap 148 is provided that sealingly engages the interior surface 90 of the body 64 as shown in FIG. 7. When it is desired to again to dispense liquid pesticide S from the drum E, the cap 148 is removed, and the tube 86 and probe 80 are caused to engage the closure member H as shown in FIG. 4. In those instances where the drum E is not provided with a bead 62, but instead a tapped opening, the adapter shown in FIG. 15 may be used. The adapter 148 shown in FIG. 15 is of tubular structure and includes threads 150 that engage the threads of the tapped discharge opening (not shown) on the drum E, and the adapter when screwed into the opening in the drum providing a circular bead 152 that may be engaged by the flange 66 in the same manner as the flange engages the bead 62 shown in FIG. 4. A gaging device T is shown in detail in FIG. 16 for determining the volume of the liquid pesticide S in the drum E in which it is delivered. The gaging the device T includes an elongate tube 200 formed from a transparent material that has a lower open end 202 and an upper closed end 204 in which a small vent opening 206 is defined. The tube 200 has a series of longitudinally extending graduations 208 thereon that indicate the volume of liquid pesticide remaining in the drum E. The gaging device T includes a cylindrical float 210 that is longitudinally movable in the tube 200. The float 210 has a rod 212 extending upwardly therefrom, with the upper end of the rod supporting a transverse marker 214. When the tube 200 is extended downwardly through a vent opening 215 in the top of the drum E to allow the lower end 202 of the tube 200 to rest on the bottom of the drum, the float 210 will move upwardly due to the buoyancy thereof in the liquid pesticide, with the marker 214 indicating on the graduation 208 the volume of the liquid pesticide remaining in the drum E. The float 210 is preferably removably secured to the rod 212 by threaded means or other conventional means (not shown). Inasmuch as specific gravity of various liquid pesticides varies, float 210 will be selected that will give a correct reading of the marker 214 on the graduation 208 for the particular liquid pesticide disposed within the drum E.

A second assembly U is shown in FIG. 9 that permits liquid pesticide to be transferred from a jug or container 216 in which it is sold to a tank 218 from which it is to be dispensed, with the transfer of the pesticide being through a closed path. The jug 216 has a neck 217 that has threads formed thereon (not shown) and the tank 218 likewise has a neck 220 on which threads (not shown) are defined. A first tubular connector 222 is provided that is internally threaded and engages the neck 217 as shown in FIG. 9. The connector has a conduit 224 extending therefrom to a first valve 226 that is open and closed by use of a handle 227. The first valve 226 has a conduit 228 extending therefrom through a cover 230 that by conventional means removably engages the upper open end of a cylinder 232 that has a tapered bottom 232a. The cylinder 232 has a series of longitudinally extending graduations 231 thereon that indicate the volume of liquid pesticide within the cylinder. A conduit 234 extends from the bottom 232a to a second valve 236 that is open and closed by a handle 237. A conduit 238 extends downwardly from the second valve 236 to a tubular fastener 240 that is internally threaded, and is adapted to removably engage the threaded neck 220 of the tank 218 when a portion of the fastener 240 is rotated relative to the neck.

A third valve 242 is provided that is opened and closed by use of a handle 241. The third valve 242 has a conduit 244 extending therefrom to a hose coupling 246 that may be removably secured to the end of a hose 248 that is connected to a source of water under pressure, with the hose 248 being shown in phantom line in FIG. 9. The third valve 242 has a conduit 250 extending therefrom to a tee 252. The tee has a first tube 254 connected therethrough that extends upwardly through the connector 222 into the interior of the jug 216 adjacent the bottom 216a thereof. The first tube 254 has a closed end 254a adjacent bottom 16a, and spaced ports 254b formed in tube 254 adjacent the closed end. A fourth valve 255 is disposed in tube 254 between tee 252 and connector 222. A second tube 256 is also connected to the tee 252 and extends downwardly into the interior of the cylinder 232 through the cover 230 thereof.

The second assembly U is used by disposing the bottom 216a of the jug 216 on the ground or horizontal surface, with the closure (not shown) then being removed from the neck 217 of the jug and the connector 222 then secured thereto. The first valve 226, second valve 236 and third valve 242 are in the closed position. The assembly U is then placed in the inverted position as shown in FIG. 9, and the first valve 226 is opened to permit liquid pesticide in the jug 216 to drain downwardly therefrom into the cylinder 232 by gravity until a desired amount of the pesticide is in the cylinder. The fourth valve 255 is also opened to permit air displaced by liquid pesticide as the latter flows into cylinder 232 to be vented upwardly into jug 216. After a desired amount of liquid pesticide has accumulated in the cylinder 232 the second valve 236 is open, together with the third valve 242 to permit the liquid pesticide to flow downwardly by gravity into the tank 218. After the pesticide has drained from the cylinder 232, the third valve 242 is closed, and the coupling 246 connected to the hose 248. The jug 216 and the interior of the cylinder 232 are concurrently subjected to wash water from the hose 248 by opening the third valve 242 and fourth valve 255 to permit wash water to flow thereinto through the first and second tubes 254 and 256. Wash water from tube 254 discharges from ports 254b as a spray within jug 216. After the jug 216 and the cylinder 232 has been subjected to wash water, the third valve 242 is closed and the hose 248 disconnected from the coupling 246. The wash water in the jug 216 and the cylinder 232 will now drain by gravity into the tank 218 by opening the first valve 226, the second valve 236, and the third valve 242. If it is desired to rinse only the cylinder 282 and the tank 218 the fourth valve 255 is disposed in a closed position together with valve 226, and valves 226 and 236 being in the open position. The portion of tube 254 within jug 216 may be separate from the portion secured to connector 222, and the two portions frictionally engaging one another.

The conduits used in the first form A of the invention are preferably flexible to permit the fitting J and probe 80 to removably engage closure H on a pesticide container E when the latter is resting on the ground surface. The material defining the hose must of course be inert and not damages by the toxic pesticide being dispensed—such hose is commercially available from a number of sources. After the container 216 and cylinder 232 shown in FIG. 9 have been rinsed with wash water the third valve 242 is closed and the first and second valves 226 and 236 are opened to permit the wash water to drain into tank 218.

The use and operation of the various forms of the invention have been previously described in detail, and need not be repeated.

What is claimed is:

1. In combination with a flat bed truck that has a side wall extending from said bed, a drum that holds a toxic liquid pesticide and has an opening defined by a circular upwardly extending bead in an upper portion thereof, a wash water containing drum that may be disposed adjacent said flat bed, and a tank to which the pesticide is to be dispensed, a portable assembly capable of being removably supported from said side wall for selectively transferring said pesticide in a closed path either directly from said drum when the latter is adjacent said sidewall, said assembly including:

a. a closure assembly that includes a cup-shaped body insertable in said opening in said drum, said body having at least one longitudinal port therein, a first tube that extends downwardly from said cup-shaped body and supported thereby that is in communication with the interior thereof, normally closed spring-loaded valve means in said first tube that is open when subjected to a downwardly directed force, and flange means that extend outwardly from said body that sealingly and removably engage said bead to hold said closure assembly on said drum;

b. first, second, third, fourth, fifth, sixth, seventh and eighth valves;

c. a pump that has a suction and discharge opening;

d. a fixture assembly that includes a shell that defines a confined space, a second tube that extends from said shell and is in communication with the interior thereof, said second tube removably sealing with the interior of said cup-shaped body, a tubular probe that extends through said shell and said second tube and cooperating with the latter to define an annulus-shaped space that is in communication with said confined space and the interior of said drum, lock means that removably secure said shell in communication with said confined space;

e. an elongate vertically disposed metering cylinder that has longitudinal graduations thereof that indicate the volume of pesticide in said cylinder, said cylinder having a top that has first and second openings therein and a bottom that has a third opening therein;

f. first, second, third, fourth, fifth, sixth, seventh, and eighth conduits, said first conduit connected to said first opening and first valve; said second valve connected to said second opening and second valve; said third conduit connected to said second valve and said wash water drum; said fourth conduit connected to said third conduit and said opening in said shell and having said eighth valve therein; a fifth conduit extending from said probe to said suction of said pump, said fifth conduit having said seventh, third and fifth valves therein; a sixth conduit extending from said fifth conduit between said fifth valve and suction of said pump to said first conduit, said sixth conduit having said sicth valve therein; a seventh conduit extending from said discharge of said pump to said dispensing tank, and an eighth conduit extending from said fifth conduit between said third and fifth valves to said third opening, said eighth conduit having said fourth valve therein; and the suction created when said pump operates causing liquid pesticide to flow from said drum in which it is contained to said dispensing tank when said seventh, third and fifth valves are open and the balance of said valves closed; said pump when said seventh, third and fourth valves are open and the balance of said valves closed causing liquid pesticide to flow from said drum in which it is contained to said cylinder to have a desired quantity of said pesticide in said cylinder; said pump when said first, fourth and fifth valves are open and the balance of said valves closed transferring liquid pesticide from said cylinder to said dispensing tank; said pump when said eighth, seventh, third and fifth valves are open and the balance of said valves closed causing wash water to flow from said wash water drum through said third conduit, fourth conduit, confined space in said shell, said annulus space, said longitudinal port, the interior of said pesticide containing drum, said probe, said fifth conduit, pump and seventh conduit to said dispensing tank, and said pump when said second, fourth and fifth valves are open causing wash water to flow from said wash water drum through said third and second conduits to wash the interior of said cylinder and discharge therefrom through said eighth conduit, portion of said fifth conduit, pump and seventh conduit to said dispensing tank;

g. a frame that supports said cylinder and at least a portion of said valves and conduits; and h. first means for removably supporting said frame from a side wall of a flat bed of an automotive vehicle.

2. An assembly as defined in claim 1 which in addition includes:

g. first means in said cylinder for deflecting wash water from said first conduit over the entire interior surface of said cylinder to wash said pesticide therefrom.

3. An assembly as defined in claim 1 which in addition includes:

g. check valve means in said cylinder adjacent said top thereof for preventing said pesticide rising to the extent in said cylinder that it will enter said second conduit.

4. An assembly as defined in claim 1 in which said lock means is an L-shaped slot in said probe that is capable of removably engaging a lug provided on said tube supported from said cup-shaped body.

5. An assembly as defined in claim 1 that is portable and may be manually carried as an integral unit from place to place.

6. In combination with a drum that holds a toxic liquid pesticide and has an opening defined by a circular upwardly extending bead in an upper portion thereof, a wash water containing drum, and a tank to which the pesticide is to be dispensed, an assembly for selectively transferring said pesticide in a closed path either directly from said pesticide containing drum to said dispensing tank or as a metered amount to said dispensing tank and said assembly capable of being internally cleaned by water from said wash water tank after the transfer of said pesticide has been completed, said assembly including:
  a. a closure assembly that includes a cup-shaped body insertable in said opening in said drum, said body having at least one longitudinal port therein, a first tube that extends downwardly from said cup-shaped body and supported thereby that is in communication with the interior thereof, normally closed spring-loaded valve means in said first tube that is open when subjected to a downwardly directed force, and flange means that extend outwardly from said body that sealingly and removably engage said bead to hold said closure assembly on said pesticide containing drum;
  b. first, second, third, fourth, fifth, sixth, and seventh and eighth valves;
  c. a pump that has a suction and discharge opening;
  d. a fixture assembly that includes a shell that defines a confined space, a second tube that extends from said shell and is in communication with the interior thereof, said second tube removably sealing with the interior of said cup-shaped body, a tubular probe that extends through said shell and said second tube and cooperating with the latter to define an annulus-shaped space that is in communication with said confined space and the interior of said pesticide containing drum, lock means that removably secure said probe to said first tube, and an opening in said shell in communication with said confined space;
  e. an elongate vertically disposed metering cylinder that has longitudinal graduations thereof that indicate the volume of pesticide in said cylinder, said cylinder having a top that has first and second openings therein and a bottom that has a third opening therein;
  f. first, second, third, fourth, fifth, sixth, seventh, and eighth conduits that are so interconnected to said wash water containing drum, said pesticide containing drum, cylinder, and dispensing tank and have said valves so operatively associated therewith that when said pump is operating and a first portion of said valves are open and the balance closed said pesticide is transferred through a closed path from said pesticide containing drum to said dispensing tank, when a second portion of said valves are opened and the balance closed a desired quantity of said pesticide may be transferred from said pesticide containing drum to said cylinder, when a third portion of said valves are open and the balance closed said pesticide may be transferred through a closed path from said cylinder to said dispensing tank, when a fourth portion of said valves are open and the balance closed water from said wash water containing drum may be circulated through said pesticide containing drum to wash pesticide therefrom and discharge the same to said dispensing tank, and when a fifth portion of said valves are open and the balance of said valves closed water from said wash water tank may be circulated through said cylinder to remove pesticide from the interior thereof and discharge the same to said dispensing tank.

7. In combination with a container that holds a toxic liquid pesticide, and a source of water, an assembly for transferring a desired quantity of said pesticide from said container to said tank through a closed path, said assembly including:
  a. an elongate vertically disposed cylinder having a top and bottom that cooperate to define a confined space in which various quantities of said pesticide may be disposed;
  b. a pump that has a suction and discharge opening;
  c. first means on said cylinder for visually indicating the volume of said pesticide therein;
  d. a first conduit that extends from said discharge opening to said dispensing tank;
  e. a plurality of second conduits in communication with said suction opening, said confined space in said cylinder, said container, and said source of water; and
  f. a plurality of valves in said second conduits that are so disposed that when said pump is operating and a first portion of said valves are open and the balance closed said pesticide will be drawn from said container to said cylinder through a closed path until a desired volume of said pesticide is in said cylinder which is visually indicated by said first means whereupon said first portion of said valves are closed, with said desired quantity of pesticide being withdrawn from said cylinder and discharged to said dispensing tank when a second portion of said valves are open and the balance closed, and said cylinder being rinsed with water from said source when a third portion of said valves are open and the balance closed, said rinse water being dischargeable through said first conduit to said dispensing tank.

8. An assembly as defined in claim 7 in which said cylinder is formed from a polymerized resin sufficiently transparent for the liquid level of said pesticide to be visible therein, and said first means are vertically disposed graduations operatively associated with said cylinder and so numbered as to indicate the volume of pesticide in said cylinder when said liquid level is horizontally aligned with a particular graduation.

9. An assembly as defined in claim 8 in which said assembly is portable and which in addition includes:
  g. a frame that supports said cylinder, pump, at least a portion of said second conduits and said valves in fixed relationship with one another to define an integral unit.

10. In combination with a portable container that has a bottom and a first neck and which container holds a toxic liquid pesticide, a dispensing tank that has a second neck, a hose that is connected to a source of water, an assembly for transferring a desired quantity of said pesticide from said container to said tank through a closed path and for rinsing the interior of said container with wash water after substantially all of said pesticide has been transferred from said container, said assembly including:
  a. an elongate cylinder that has a first closed end and a second tapered end portion in which an opening is defined;
  b. a first tubular connector that removably engages said first neck;
  c. a first valve in communication with said first connector and an opening in said first end;
  d. a second valve secured to said second end portion and in communication with said opening therein;
  e. a second tubular connector in communication with said second valve and in removable engagement with said second neck;
  f. graduated means operatively associated with said cylinder for visually indicating the volume of said pesticide in said cylinder when said first end of said cylinder is in an uppermost position;
g. a third valve that has first and second ends;
h. a coupling on said first end that may be removably connected to said hose;
i. a tubular tee connected to said second end of said valve; and
j. first and second tubes connected to said tee, said first tube extending through said first connector into said container to terminate adjacent said bottom thereof, and said second tube extending through an opening in said first end of said cylinder to communicate with the interior thereof, said liquid pesticide flowing by gravity from said container to said cylinder until a desired quantity has accumulated therein by opening said first valve with said second and third valves closed, with air in said cylinder being vented through said first and second tubes to the interior of said container as said flow by gravity takes place, said first valve being closed when said desired quantity has accumulated in said cylinder, said desired quantity of said pesticide in said cylinder flowing into said dispensing tank by gravity when siad second valve is opened, and the interior surfaces of said container and cylinder being concurrently rinsed with wash water from said hose after substantially all of said pesticide has been transferred from said container by opening said first, second and third valves, with said wash water draining by gravity to said dispensing tank.

* * * * *